Jan. 9, 1945.  J. D. FRENCH  2,366,715
TRAFFIC AND OTHER MARKER
Filed Oct. 24, 1939  4 Sheets-Sheet 1
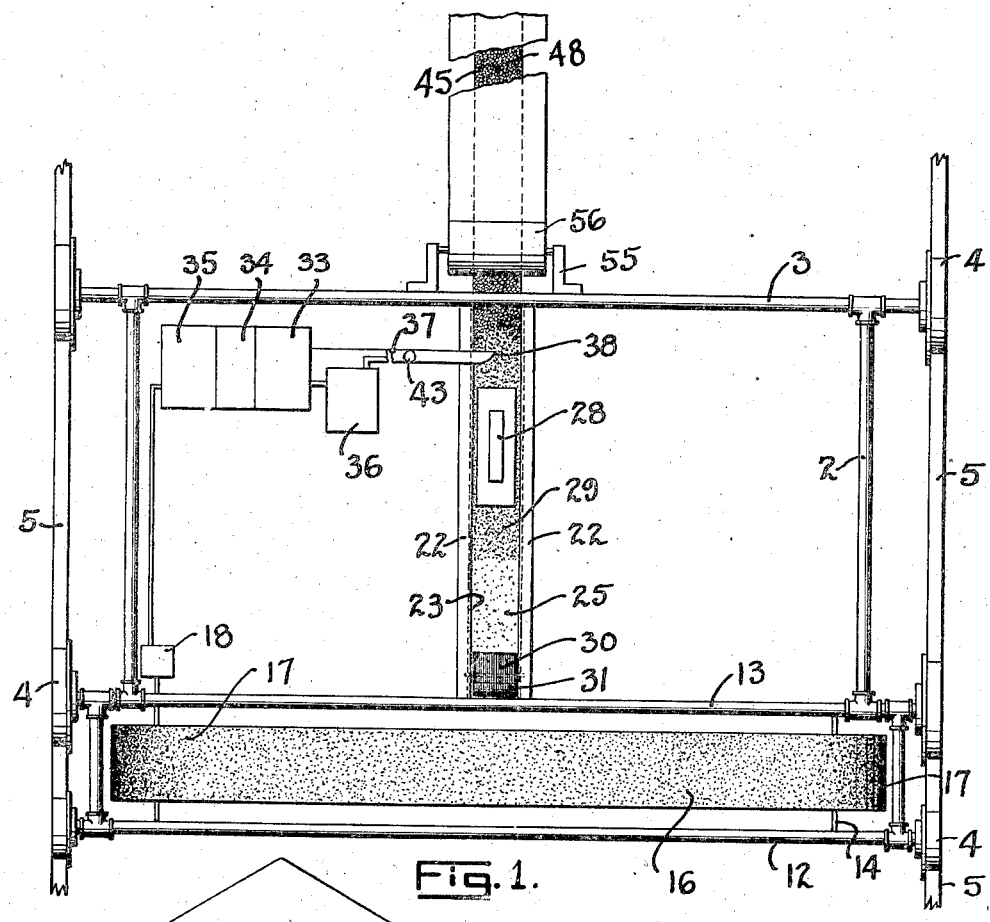
Fig. 1.
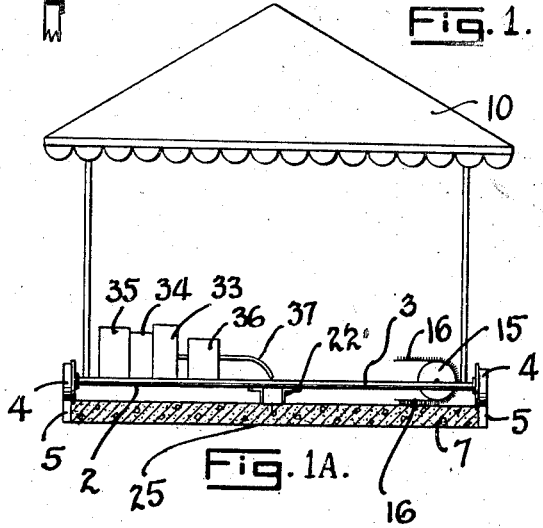
Fig. 1A.
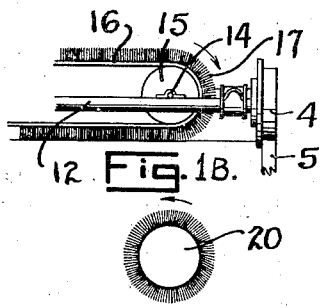
Fig. 1B.
Fig. 2.
JAS. D. FRENCH
INVENTOR
BY Jesse R. Stone
Lester B. Clark
ATTORNEYS.

Jan. 9, 1945. J. D. FRENCH 2,366,715
TRAFFIC AND OTHER MARKER
Filed Oct. 24, 1939 4 Sheets-Sheet 2

JAS. D. FRENCH
INVENTOR
Jesse R. Stone
BY Lester B Clark
ATTORNEYS.

Jan. 9, 1945.  J. D. FRENCH  2,366,715

TRAFFIC AND OTHER MARKER

Filed Oct. 24, 1939  4 Sheets-Sheet 4

JAS. D. FRENCH
INVENTOR

BY Jesse R. Stone
Lester B. Clark
ATTORNEYS.

Patented Jan. 9, 1945

2,366,715

UNITED STATES PATENT OFFICE 2,366,715

TRAFFIC AND OTHER MARKER

James D. French, Austin, Tex.

Application October 24, 1939, Serial No. 301,000

3 Claims. (Cl. 94—1.5)

The invention relates to a means and method of providing traffic and other markers to define hazards and promote safety.

The present invention is in the nature of a continuation in part of my prior co-pending application, Serial No. 136,517, filed April 13, 1937, for a Highway stripe which has matured into Patent 2,184,492, issued Dec. 26, 1939, and is directed generally to the provision of permanent markers which may be applied while the base is plastic or semiplastic or may be applied to existing bases.

It is one of the objects of the invention to provide traffic safety markers which may be applied directly to the highway to define the traffic lanes, to curbstones to indicate locations, as well as to various types of warning signs, bridge ends and approaches, culverts and other types of hazardous objects so as to make all of such markers available on objects so that they will be readily visible during the day and at night as well.

It is one of the objects of the invention to provide a permanent means and method for applying a traffic line to define the traffic lanes upon a highway either while the material of the highway is in plastic or semi-plastic condition or upon an existing highway by proper treatment of a portion of the surface thereof.

Another object of the invention is to provide a combination of a permanent traffic marker for traffic hazards wherein an object to be marked is made up of a cementitious base or has such a base applied to it, and a plurality of reflector members such as beads, spheres or chips of a suitable reflecting material will be permanently embedded in the cementitious base so as to reflect the rays from the vehicles and warn the operators of the hazard.

Another object is to apply a cementitious base material under pressure so as to suitably receive either or both a coloring for signs or/and reflecting particles.

Another object of the invention is to provide a method of applying a permanent traffic marker which includes troweling a marking material into a plastic or semi-plastic surface, treating the surface so provided with reflector members and covering the surface to prevent premature curing thereof.

It is also an object of the invention to provide an apparatus for furnishing a non-skid surface upon concrete highways.

Still another object of the invention is to provide a method of applying markers to highway hazards or locations wherein a cementitious base is applied or existent upon the object, the outline of the warning applied to this base before it takes its initial set and thereafter applying reflector material to such warning outline so that the entire assembly acquires a permanent set.

Another object of the invention is to provide apparatus for practicing the invention so that the markers may be suitably applied.

Other and further objects of the invention will be readily apparent when the following description is considered in connection with the accompanying drawings, wherein:

Fig. 1 is a top plan view of the invention being practiced while applying a traffic line and illustrates the apparatus used therein.

Fig. 1A is an end view showing a diagrammatic arrangement.

Fig. 1B is a broken detail view of the brush for applying a non-skid surface.

Fig. 2 is an end view of another type of brush which may be utilized in providing a non-skid surface.

Figure 3:
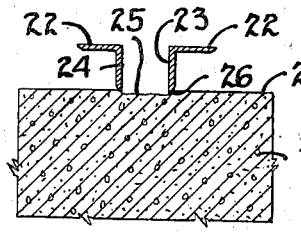
Fig. 3 is a sectional view thru a portion of the road to which the line is being applied and illustrates the guides or stencil to define the area to be marked.

The invention will first be described as applied to plastic or semi-plastic surfaces such as road or bridge structures where the concrete has merely taken its initial set and before the final set has occurred. It is to be understood of course that the invention may be applied to structures which are rigid and have been previously formed. The application in the two instances, however, is somewhat different and they will be separately described.

In Fig. 1 the invention will be applied by the use of an apparatus 2 which includes a frame 3 mounted on wheels or rollers 4 which travel on the trackway 5 at each side of the roadway. The arrangement of these parts is seen in end elevation in Fig. 1A. The apparatus 2 may include a roof or canopy 10 which is suitably supported on the frame 3 to protect the workers and the stripe being created against sun and rain. In this manner excessive evaporation and premature setting may be avoided.

The frame 3 is made up of a plurality of rods and may carry an extension formed of the rods 12 beyond the end rod 13. This extension carries shafts 14 at the opposite ends which in turn carry the rotatable wheels 15. The endless brush 16 is mounted to travel around these two wheels 14 on opposite ends of the frame and the bristles or tines 17 of the brush 16 are arranged to wipe crossways of the roadway 7 so as to form a nonskid surface. Power means 18 is arranged to permit driving of the wheels 15 so as to carry the brush across the surface.

Fig. 2 shows a slightly different device which is somewhat simpler in that it merely comprises a rotatable member which can be run up and down between the bars 12 and 13 to roughen the surface if desired.

In order to define the area 25 which is to be converted into the marking stripe, a plurality of guides or stencil bars 22 are adjustably carried by the frame 3 as best seen in Figs. 1 and 1A. These bars have the downwardly extending legs 24 thereof spaced apart equal to the width of the stripe which is to be formed and in this manner the width of the area 25 which is to be striped is separated from the rest of the surface. As seen in Fig. 3 the lower edge 26 of these bars is impressed slightly into the surface 27 of the base 7 which will be remembered as in plastic form.

As pointed out in my prior co-pending application I have found that magnetic iron oxide is a suitable coloring material, first because it has a greater specific gravity than the concrete material and will settle by gravity into the plastic concrete so that the penetration of from ⅛" to ¼" is obtained which insures that a permanent stripe or line of demarcation will be had. This iron oxide also adds to the strength of the concrete so that the colored area is if anything capable of greater service than the body of the concrete. Another advantage is that the oxide may be used in dry powdered form or mixed into a slurry as desired. A roller 30 having tines 31 is shown in Fig. 1 to assist in introducing the coloring matter. The coloring matter may be applied by merely scattering it in powdered form upon the surface 25 and working it in with the trowel 28 or it may be applied thru a nozzle 37 by means of fluid under pressure as may be furnished by a compressor 33. In either event there is a bonding of the colored concrete with the body so that a permanent integral slab is provided. Suitable tanks 34, 35 and 36 are provided for other materials which may be applied thru the nozzle, 37, if desired. Thus the tank 33 may contain a black cement slurry made of fine sand cement, magnetic iron oxide and water while the tanks 34 and 35 may contain other colors or the reflecting particles such as glass spheres, beads or different colored stone chips as desired. These materials may be applied under pressure as will be hereinafter described.

Figures 17, 18:
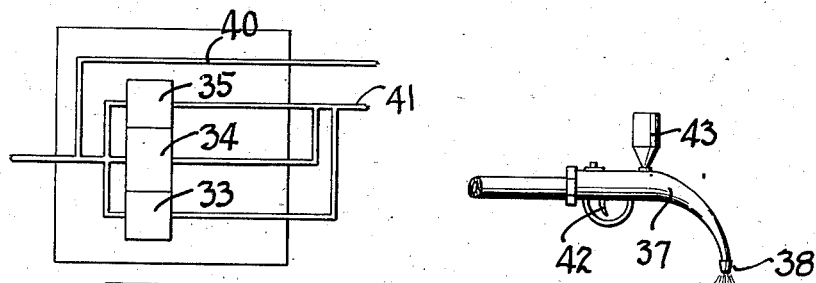
Fig. 17 is a top plan view showing a diagrammatic arrangement of the tanks for the materials to be used.
Fig. 18 shows a detail of a nozzle for applying the materials under pressures.

A plan view showing a diagrammatic arrangement of these tanks along with the piping 40 which serves to conduct the materials is best seen in Fig. 17, while Fig. 18 shows a form of the nozzle 37 as having a discharge nipple 38 thereon which may be of a construction whereby materials may be applied under high pressure to the surface. A trigger 42 controls the discharge and a tachometer 43 may be used to note the speed or pressure on the materials passing thru the nozzle.

A low pressure pipe 41 extends from the compressor to each tank and the piping 40 is connected to the nozzle 37. High pressure is also connected to the nozzle so as to get the slurry onto the surface and it has been found that a pressure of about 1750 pounds per square inch in the nozzle is suitable.

Figure 4:
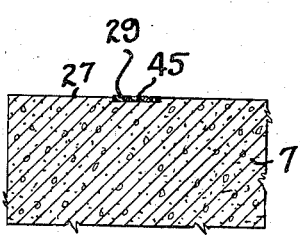
Fig. 4 is a section similar to Fig. 3 illustrating the coloring material as having been applied to or incorporated in the plastic surface of the road.
Figure 5:
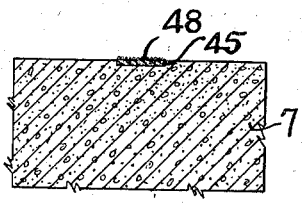
Fig. 5 shows the completed stripe of Fig. 4 with the reflector material applied thereto.
Figure 6:
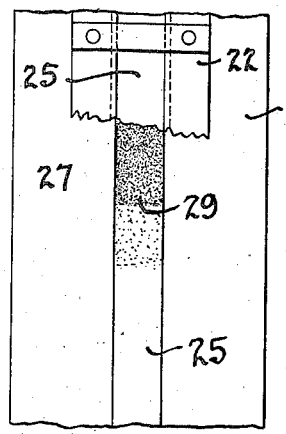
Figs. 6, 7 and 8 are top plan views illustrating the steps in the procedure as seen in Figs. 3, 4 and 5 respectively.
Figure 7:
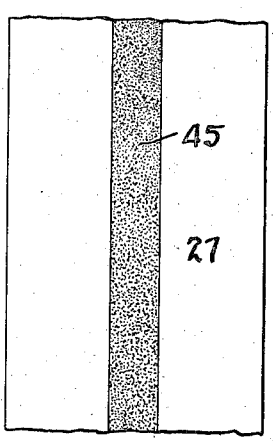
Figure 8:
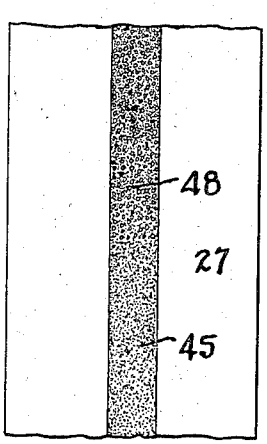

Figs. 3 and 6 show the arrangement of the guide bars and the area 25 which has been roughened so as to next receive the coloring slurry or the dry coloring while Figs. 4 and 7 show the area as having been marked by applying the slurry or working the coloring matter 29 into the surface. The completed strip is illustrated at 45 in Fig. 4 and is clearly discernible from the rest of the surface 27. In Figs. 5 and 8 the surface 45 has had a reflecting material 48 applied thereto so that the light rays from a vehicle will be reflected in all directions and the stripe readily discernible at night. Figs. 6, 7 and 8 show the progress of the construction of Figs. 3, 4 and 5 respectively.

Figures 9, 10:
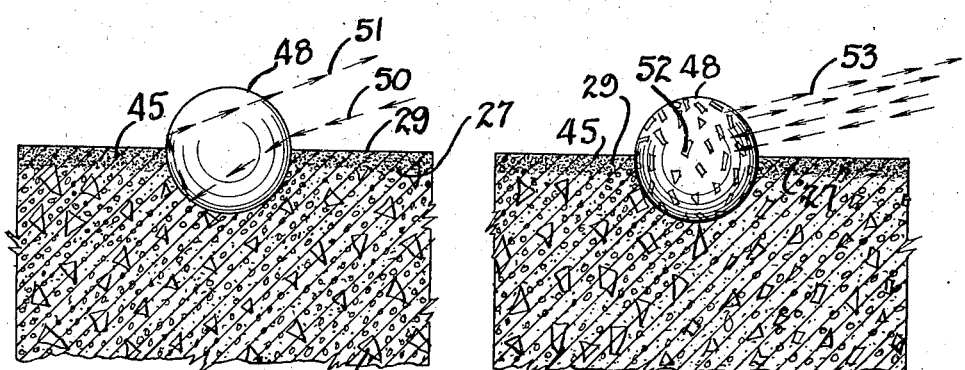
Fig. 9 is an enlarged sectional view illustrating a reflector sphere as having been embedded in the surface.
Fig. 10 is similar to Fig. 9 but shows a sphere which of itself carries reflecting members.

Fig. 9 is an enlarged sectional view of the arrangement wherein the plastic base 7 has had the coloring material 29 applied to it to form the stripe 45, and it will be observed that this coloring matter has been mixed into the surface 27 for a substantial distance if it were applied dry and has formed a coating if it were applied as a slurry under pressure. One of the particles of reflecting material 48 is shown as having been applied under pressure to the surface. While a spherical body has been illustrated, it is to be understood that these reflecting beads may be of any suitable shape or configuration, the present illustration being a glass sphere which has had a substantial portion of its diameter embedded into plastic concrete by being applied by pressure from the nozzle 37 so that the beads are firmly bonded in the concrete or base. The line 50 illustrates the ray of light from the headlamp of a vehicle and illustrates how the light will be received by the reflecting member 48 and the reflection beam 51 turned back by the reflecting body. This beam 51 will be readily observed by the driver of the vehicle so as to warn him that there is a traffic lane, or traffic hazard represented by this reflected light.

The rigid structure such as the post 62 will first be suitably cleaned and roughened with a sand blast or other cleaning method to remove traffic grime, dust particles and resins which might affect the bond with the cementitious material and the rigid structure.

Figure 11:
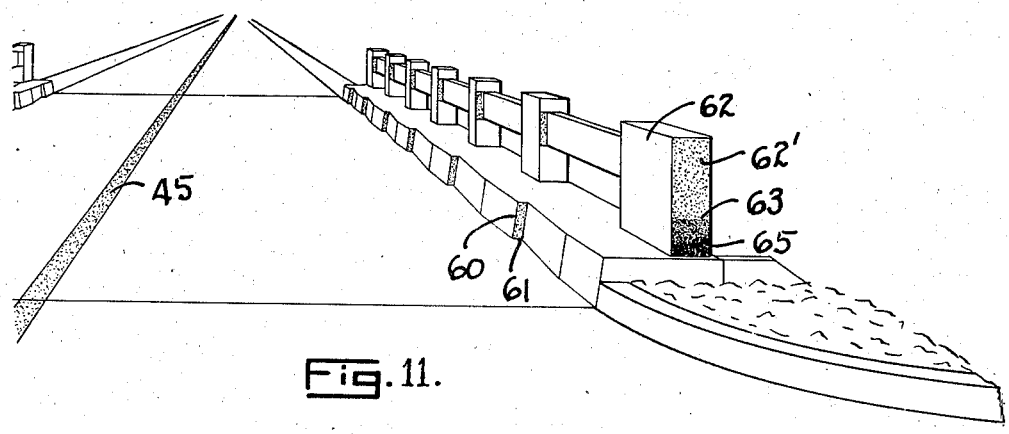
Fig. 11 is a perspective view of a bridge illustrating the stripe as having been applied to the highway and various portions of the bridge as having been marked so as to make them readily visible during day or at night.

In Fig. 11 the base has been roughened at 62'. A suitable cementitious slurry 63 can be now applied with the pressure apparatus 33 and the nozzle 37. It has been found that a nozzle pressure of about 1750 pounds per square inch with the nozzle held about four inches from the work results in a dense coating or base which sets up firmly and forms a permanent bond with the base structure. When thus applied under high pressure this base will have a greater density than the material to which it adheres and thus forms either a suitable background upon which to assemble the balance of the sign or the reflecting particles 65 may be applied directly thereto. If the sign or warning is to have distinguishing characters, letters, numerals or indicia of some sort thereon a slurry of a different coloring material 64 will be quickly applied to this base material. Reflecting particles 65 are next applied by the pressure apparatus of Fig. 1 or otherwise applied as seen in Figs. 9 and 10.

Fig. 10 shows a view somewhat similar to Fig. 9 but wherein the sphere or reflector 48 is of special construction in that it carries a plurality of reflecting pieces, 52. These pieces will individually reflect the light rays as illustrated by the lines 53 so as to increase the visibility of the traffic hazard and to create a greater factor of safety.

In Fig. 1 a bracket 55 is carried by the frame 3 and supports a roll 56 of paper or other suitable material which may be laid out over the finished stripe as the machine progresses. This paper protects the stripe, prevents premature curing and may be readily removed.

In a great many instances the marker may be applied to existing structures such as roads, bridges, curbings, posts, conduits and other traffic hazards and may also be applied to signs so as to provide information which can be observed by the drivers during the day or at night.

Figure 13:
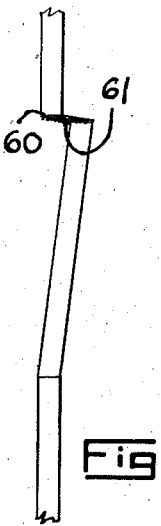
Fig. 13 is an enlarged view of an offset in the highway which has been marked with the invention.

When the invention is to be applied to a rigid structure such as an existing base of concrete, steel, asphalt or wood background, such as a sign or curbing or conduit, as well as to bridge ends and intermediate posts or traffic line stripes, it is necessary to apply a suitable cementitious base which will adhere to the rigid structure in order to assemble the sign. One such illustration is seen in the perspective view of a bridge in Fig. 11. In this arrangement there are offsets 60 in the face of the bridge so as to provide a shoulder such as 61 as seen in Fig. 13.

The same procedure will be followed with the offsets 60 or any other structure to which the mark is to be applied where the structure has been previously in existence, regardless of whether it is a roadway, bridge end, post, curve or other hazard which is to be marked. It is to be distinctly understood that various types of markers may be variously colored and the following list of colors may be obtained by using the appropriate pigments:

| Color | Pigment |
| --- | --- |
| Black | Black magnetic iron oxide. |
| Whites | Titanium dioxide. Antimony oxide. White cement. |
| Reds | Para toners and lakes light to deep. Toluidine toners and lakes. Pure chlornitraniline red. Madder lakes. Alphanaphthylamine toner. |
| Bright orange | Orthonitraniline orange toner. |
| Dull orange | Orange ferrite (iron hydroxide). |
| Bright yellows | Hansa yellow toner, 10G, 5G and G concrete. |
| Dull yellow | Lemon ferrite (iron hydroxide). |
| Greens | 1 hydrated chromium oxide. 2 chromium oxide. |
| Blue | Ultramarine blue. |
| Dull red | Spanish and Persian Gulf iron oxides. |
| Brown | Brown iron oxides. |

Figure 12:
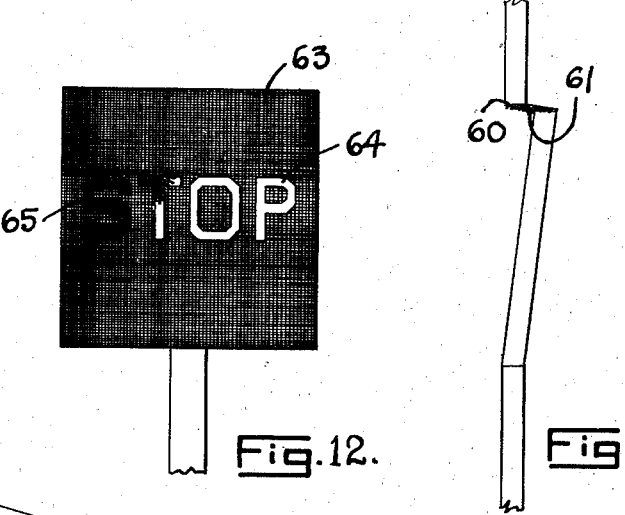
Fig. 12 shows a traffic sign to which the invention is being applied.

Fig. 12 shows a stop sign wherein the bonding material 63 has been applied as a background and may be black or any desired color upon which the distinguishing coloring matter 64 in the form of letters may be placed. Suitable stencils or forms are applied to the background in order to define the area 64 which is to be colored and in Fig. 12 the word "Stop" has been outlined and the distinguishing coloring material 64 applied to this area to define the letters. Thus if the base 63 were black the letters 64 might be white; and lastly the reflecting particles 65 have been applied to the colored areas 64 while they in turn were plastic. The slurry used in vertical positions may be thicker and when very quickly applied under pressure sets in a very few minutes so that a sign can be finished at once.

Figure 14:
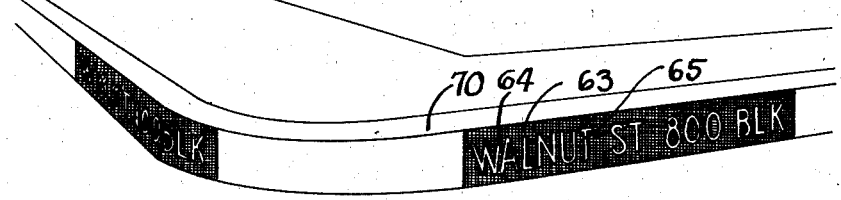
Fig. 14 shows a traffic intersection wherein the invention has been applied to the curbstone.
Figure 15:
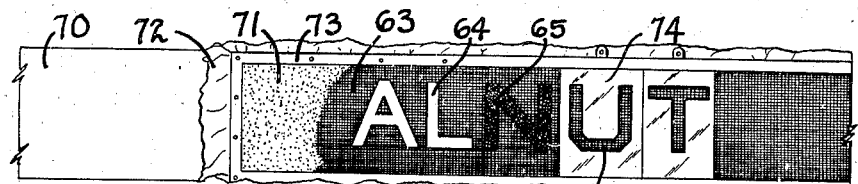
Fig. 15 is a detailed view of the marking in Fig. 14 and illustrating the details of the application thereof.
Figure 16:
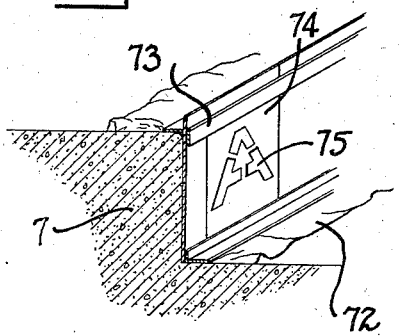
Fig. 16 is a broken detail view showing a form of stencil which may be used.

Fig. 14 shows a curbstone 70 to which the invention has been applied in order to designate the particular streets. The manner of application to the curbstone is best seen in Fig. 15 where the surface has been suitably cleaned at 71. Over this surface a cloth or protective shield 72 is arranged and this shield may be held in place by a frame 73. The cementitious base or background material 63 is next applied and then the distinguishing coloring matter 64 is placed upon this base or bond. Fig. 16 shows the stencils 74 as having been slipped into the frame 73, each stencil defining the letter or numeral which is to be applied. It is thru the opening 75 in these stencils that the coloring matter is applied and worked into the base. The reflecting particles 65 are next added while the colored matter 64 is still plastic. The cloth 72 serves to protect curbstone against inadvertent coloring and also assists the operator to salvage glass beads or other particles which did not adhere to the coloring matter 64.

Figure 19:
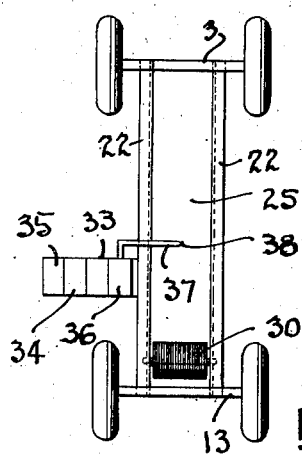
Fig. 19 shows a smaller frame than in Fig. 1 which may be used in applying the stripe to an existing highway.

Fig. 19 shows the frame 3 of Fig. 1 as having been modified to adapt it to the working of existing roads of either concrete or asphaltic or bituminous material. The member 30 will be used to roughen the surface and the nozzle 37 used to apply the colored slurry under pressure. The frame is narrow and may carry the same equipment as seen in Fig. 1 except the cross brush.

Broadly the invention contemplates a means and method of applying a permanent marking or designation to existing or newly created structures wherein the information may be visible in the day time due to the coloring thereof and visible at night time due to the reflection of light beams.

What is claimed is:

1. A method of providing colored reflecting traffic markers and signs in concrete while the surface is plastic or semi-plastic which comprises adding coloring material to the green concrete surface, working the coloring material into the surface of the concrete to obtain a minimum penetration of one-eighth inch, and working small diameter transparent glass beads into the surface of the colored green concrete so that the concrete, coloring and beads solidify as a monolithic mass.

2. A traffic marker or sign of the reflecting type comprising a concrete base material, an area thereon of the same material having a coloring pigment mixed intimately therein and small transparent glass reflecting particles embedded in the surface of the concrete colored base so that the concrete, coloring pigment and glass beads form a monolithic structure.

3. The art of forming a distinguishing marker such as a stripe on the surface of a concrete highway including the treating of a portion of the green concrete surface while the highway is plastic by adding a coloring material to such portion, working the coloring material into the concrete to obtain a penetration thereof, and thereafter and while the concrete is still plastic embedding small transparent glass beads in such highway surface, and allowing the concrete, coloring material and beads to solidify as a monolithic mass.

JAMES D. FRENCH.